US011898580B2

(12) United States Patent
Al-Anzi

(10) Patent No.: US 11,898,580 B2
(45) Date of Patent: Feb. 13, 2024

(54) CONFINED PLUNGING LIQUID JET REACTOR WITH ENERGY RECOVERY

(71) Applicant: KUWAIT UNIVERSITY, Safat (KW)

(72) Inventor: Bader Shafaqa Al-Anzi, Abdullah Almubarak (KW)

(73) Assignee: KUWAIT UNIVERSITY, Safat (KW)

( * ) Notice: Subject to any disclaimer, the term of this patent is extended or adjusted under 35 U.S.C. 154(b) by 680 days.

(21) Appl. No.: 17/112,165

(22) Filed: Dec. 4, 2020

(65) Prior Publication Data

US 2022/0176327 A1 Jun. 9, 2022

(51) Int. Cl.

| | |
|---|---|
| ***F15B 21/14*** | (2006.01) |
| ***F15B 11/072*** | (2006.01) |
| ***F04F 1/18*** | (2006.01) |
| *B01F 23/232* | (2022.01) |

(52) U.S. Cl.
CPC .............. *F15B 11/072* (2013.01); *F04F 1/18* (2013.01); *F15B 21/14* (2013.01); *B01F 23/2322* (2022.01); *B01F 23/23231* (2022.01)

(58) Field of Classification Search
CPC .... F15B 11/072; F15B 21/14; B01F 23/2322; B01F 23/23231; B01F 23/23413
See application file for complete search history.

(56) References Cited

U.S. PATENT DOCUMENTS

| | | | | |
|---|---|---|---|---|
| 5,240,598 A | | 8/1993 | Portier et al. | |
| 5,620,593 A | * | 4/1997 | Stagner | B09C 1/02 261/21 |
| 6,838,061 B1 | * | 1/2005 | Berg | C07C 45/72 422/198 |
| 7,704,389 B2 | * | 4/2010 | Koons | B09C 1/002 210/220 |

(Continued)

FOREIGN PATENT DOCUMENTS

| | | |
|---|---|---|
| DE | 2512712 A1 | 10/1976 |
| JP | 2014144450 A | 8/2014 |

OTHER PUBLICATIONS

Al-Anzi, "Air Entrainment Rates in a Confined Plunging Liquid Jet Reactor," Mar. 2006; printed from https://www.researchgate.net/publication/323945520_AIR_ENTRAINMENT_RATES_IN_A_CONFINED_PLUNGING_LIQUID_JET_REACTOR.

(Continued)

*Primary Examiner* — Dustin T Nguyen
(74) *Attorney, Agent, or Firm* — Nath, Goldberg & Meyer; Richard C. Litman

(57) ABSTRACT

The confined plunging liquid jet reactor with energy recovery includes a downcomer having an upper end, an open lower end, and a gas inlet for receiving gas, the downcomer extending into a liquid reservoir in a tank. A nozzle is mounted on the upper end of the downcomer for receiving a pressurized liquid to generate a liquid jet. The liquid jet impinges on liquid contained within the downcomer, creat- (Continued)

ing turbulence and bubbles to entrain gas introduced through the gas inlet into the liquid reservoir as the jet travels downward in the downcomer. A riser is disposed around the downcomer and defines an annular air lift column. Unentrained gas and liquid exiting the downcomer rises in the air lift column with significant energy, the upper end of the riser being connected to a turbine coupled to a generator to recover energy from the air lift column.

6 Claims, 4 Drawing Sheets

(56) References Cited

U.S. PATENT DOCUMENTS

| | | | | |
|---|---|---|---|---|
| 8,491,253 | B2 * | 7/2013 | Hays | F01D 15/00<br>415/80 |
| 8,668,187 | B2 * | 3/2014 | Al-Anzi | C02F 1/74<br>261/126 |
| 9,095,826 | B2 | 8/2015 | Kaya | |
| 9,919,320 | B2 | 3/2018 | Jameson | |
| 2020/0103324 | A1 | 4/2020 | Al-Anzi | |

OTHER PUBLICATIONS

Al-Anzi, "Performance of a novel confined plunging jet reactor incorporating an annular air lift column," Doctoral Thesis. Loughborough University, 2007.

* cited by examiner

CONFINED PLUNGING LIQUID JET REACTOR WITH ENERGY RECOVERY

BACKGROUND

1. Field

The disclosure of the present patent application relates to gas-liquid reactors, and particularly to a confined plunging liquid jet reactor with energy recovery.

2. Description of the Related Art

There are many industrial processes where it is necessary to mix a gas, such as air, with a liquid. Although sometimes a simple sparged system with a tube or air stone releasing bubbles directly below the surface of the water will suffice, for some processes, e.g., aerobic wastewater treatment, air pollution abatement, froth flotation, and fermentation, an improved gas absorption rate is desirable. In such circumstances, a plunging jet reactor may be used to achieve a high mass transfer rate at low capital and operating cost.

Plunging jet devices improve gas absorption rates by creating a fine dispersion of bubbles and by increasing the contact time between the gas bubbles and the liquid at relatively low power inputs. A plunging jet may be operated as an unconfined device or as a confined device. In an unconfined plunging jet reactor system, a liquid jet plunges into an open liquid pool, creating a conical downflow dispersion of fine bubbles and a surrounding upflow of larger, coalesced bubbles. The penetration depth of the bubbles is small due to the spreading of the submerged jet, and hence the bubble contact time with the liquid is short.

In a confined system, a Confined Plunging Liquid Jet Reactor (CPLJR) uses a vertical tube or downcomer column that surrounds the liquid jet and that is partially immersed in a receiving liquid pool contained in a reservoir. Hence, the entrained bubbles may be carried to large depths by the liquid downflow. The top end of the tube is connected to a nozzle, while the other end (bottom) is left open to the receiving liquid pool.

FIG. 2 illustrates a conventional confined plunging liquid jet reactor (CPLJR) 100. Pressurized liquid L passes through a nozzle 102, which is vertically oriented and creates a high velocity jet of liquid 104 that impinges into a body of fluid 106 located beneath the nozzle 102. Gas G may either be injected into the liquid upstream of the nozzle 102, or as shown in FIG. 2, may be drawn into the process near the point of impingement. The plunging jet 104 impinges into the body of fluid 106, which is confined by a downcomer tube or pipe 108. Near the point of impingement is a highly energetic, turbulent zone where the downward force of the plunging jet 104 fights buoyancy forces of the entrained gas G. This zone, called the "mixing zone" 110, is characterized by vigorous mixing of the gas and liquid, and a high gas-to-liquid surface area due to the small gas bubble size created by the impinging jet 104. The bulk of the high-efficiency gas/liquid contacting occurs in mixing zone 110. Below the mixing zone 110 is a zone called the "pipe flow zone" 112. The pipe flow zone 112 is characterized by a less turbulent flow pattern, where the liquid and excess gas both flow downward to exit the downcomer 108 at its open lower end 114 into a receiving tank 116.

Additionally, it would be desirable to be able to recover energy from the system, since the combined liquid and gas flowing into the receiving tank 116 has kinetic energy which, in the conventional prior art system of FIG. 2, is simply lost to fluid resistance, friction and convection. Thus, a confined plunging liquid jet reactor with energy recovery solving the aforementioned problems is desired.

SUMMARY

The confined plunging liquid jet reactor with energy recovery includes a downcomer having an upper end, an open lower end, and a gas inlet for receiving gas from an external source. The downcomer is disposed in a tank holding a reservoir of liquid and defines a hollow column extending into the reservoir. A nozzle is mounted on the upper end of the downcomer for receiving a pressurized liquid from an external source, such as a recirculating pump or the like, and is configured to generate a liquid jet downward in the hollow column. A riser tube or pipe is coaxially disposed around the downcomer and extends somewhat deeper than the downcomer, defining an annular air lift column around the downcomer that receives bubbles of gas that were not entrained in liquid in the downcomer as they exit the downcomer, providing an annular path for the gas bubbles to rise to the surface of the reservoir. The jet of pressurized liquid creates turbulence and bubbles of gas in the liquid reservoir when the jet impacts the surface of the liquid reservoir in the downcomer to entrain the gas in the liquid reservoir, and to further form a two-phase fluid formed from liquid and the gas.

A turbine is placed in fluid communication with the upper end of the riser. Upward movement of the two-phase fluid within the riser drives the turbine. The turbine is coupled to a generator for producing electrical energy.

In an alternative embodiment, an annular mesh sieve may be mounted on, and extend between, an outer surface of the downcomer and an inner surface of the riser. The annular mesh sieve breaks up the bubbles in the rising two-phase fluid into finer bubbles with decreased surface areas, which leads to higher oxygen mass transfer between the gas bubbles and the surrounding liquid, thus augmenting dissolved gas concentration in the liquid without extra cost.

These and other features of the present disclosure will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
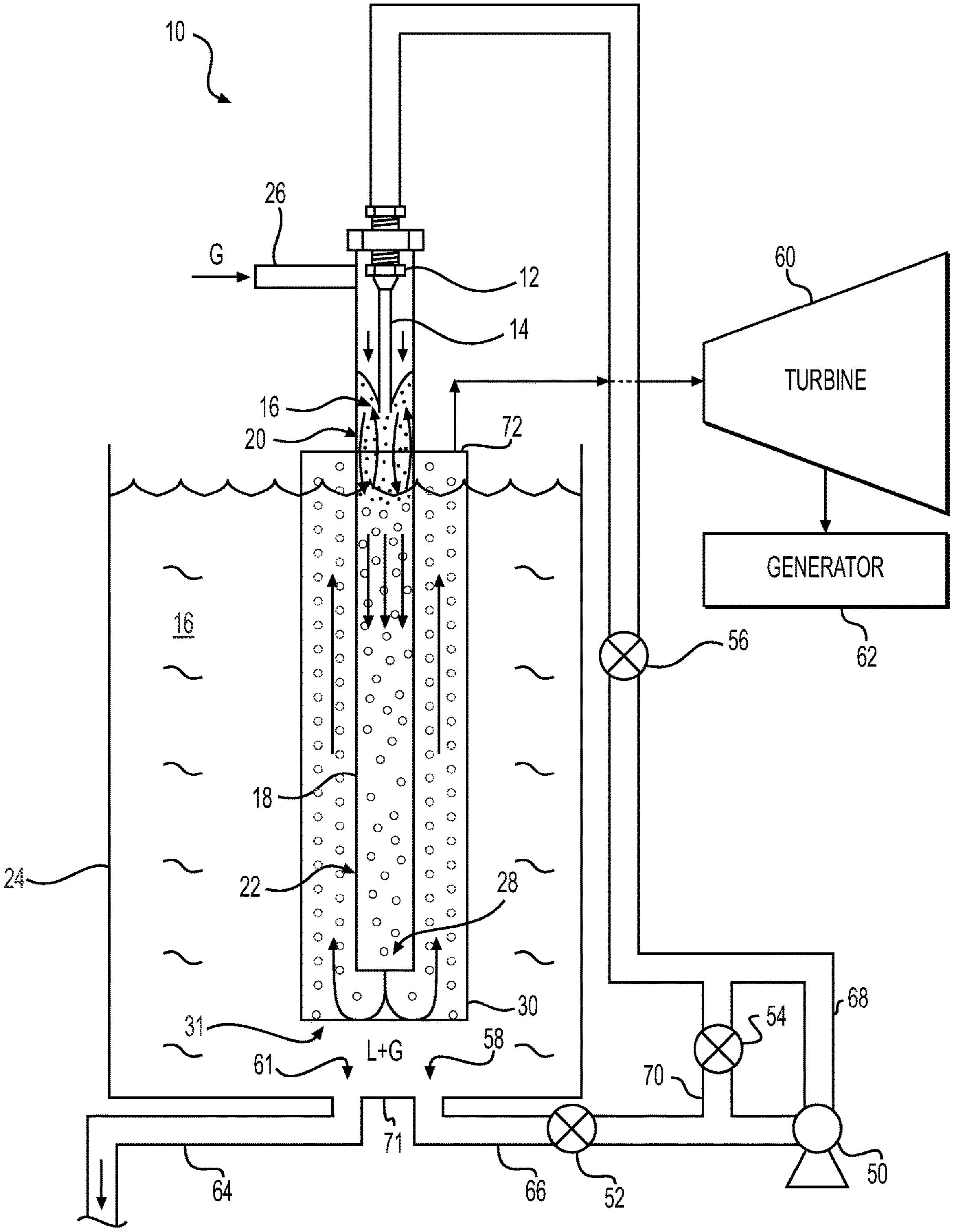
FIG. 1 is a schematic diagram of a confined plunging liquid jet reactor with energy recovery.
Figure 2:
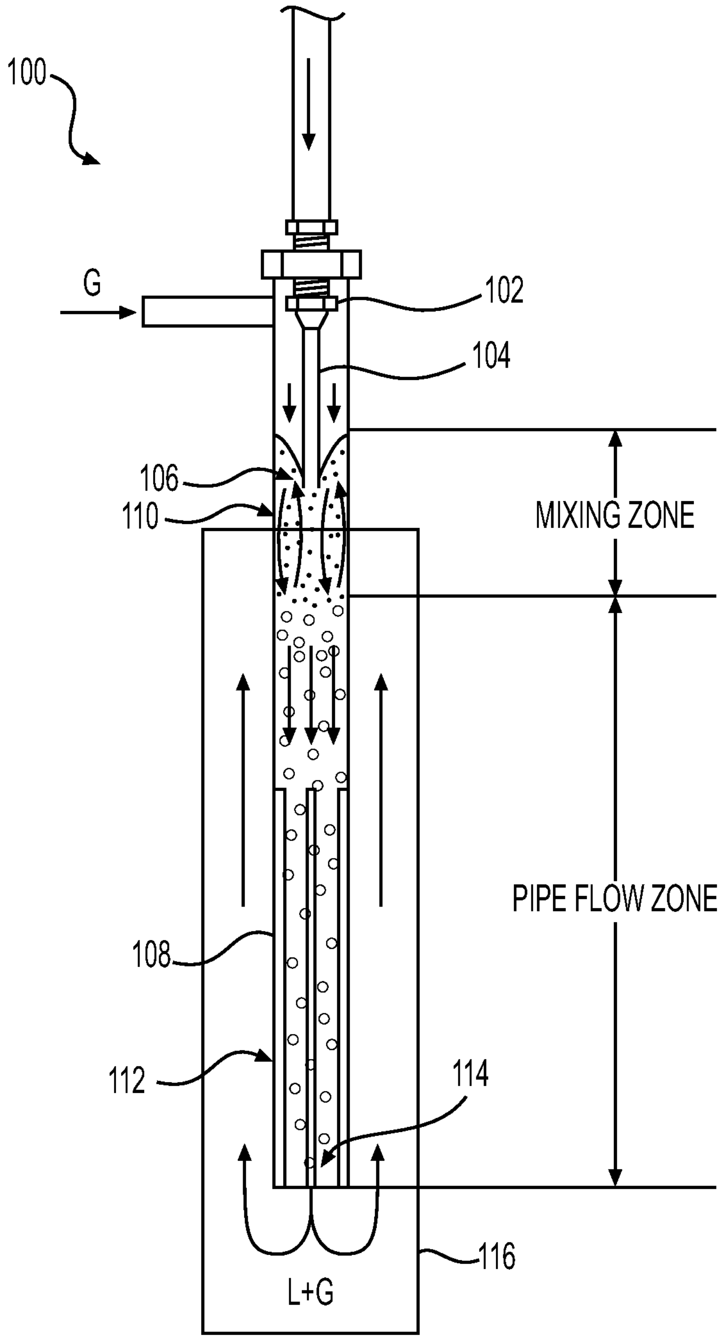
FIG. 2 PRIOR ART
FIG. 2 is a schematic diagram of a conventional prior art confined plunging liquid jet reactor.

As shown in FIG. 1, the confined plunging liquid jet reactor (CPLJR) with energy recovery 10 is similar to the conventional CPLJR 100 of FIG. 2, but with the addition of a riser 30 and a turbine 60 coupled to a generator 62 for extracting additional energy from the CPLJR during use. Similar to CPLJR 100, the confined plunging liquid jet reactor with energy recovery 10 includes a nozzle 12 for receiving pressurized liquid L. The nozzle 12 is mounted on the closed upper end of downcomer 18. However, it should be understood that the nozzle 12 is shown in FIG. 1 for exemplary purposes only, and that any suitable type of nozzle and any suitable arrangement or orientation of the nozzle 12 may be used.

The nozzle 12 is vertically oriented and creates a high velocity jet of liquid 14 that impinges into a body of liquid 16 located beneath the nozzle 12. Gas G is drawn into the process near the point of impingement through gas inlet 26, or the gas may be air from the headspace in the downcomer above the liquid 16. The plunging jet 14 impinges into the body of liquid 16, which is confined by the downcomer 18. The downward force of the plunging jet 14 fights buoyancy forces of the entrained gas G within a mixing zone 20. The gas-liquid mixture (G+L) flows down through a pipe flow zone 22, such that the liquid and excess gas both flow downward to exit the downcomer 18 at its open lower end 28 into a riser 30. As shown, the riser 30 is a tube of pipe positioned within tank 24 and having a greater diameter than the downcomer 18. The riser 30 is coaxially disposed around the downcomer 18, which serves as a liquid reservoir, the reservoir serving as the source of the liquid 16 in the downcomer 18 that the jet 14 of pressurized liquid impacts. The open lower end 31 of riser 30 is in open communication with the reservoir of liquid 16 contained in the tank 24. The riser 30 extends deeper into the tank 24 than the downcomer 18. The riser 30 defines an annular air lift column between the downcomer 18 and the riser 30 that provides a path for any gas bubbles exiting the downcomer to rise to the surface of the reservoir of liquid 16 in the tank 24.

As further shown in FIG. 1, two ports 58, 61 are formed in a lower end 71 of the tank 24. Port 61 is provided for drainage of the tank 24 through conduit 64, and port 58 is provided for recirculation of the liquid L. The two-phase gas and liquid mixture (L+G) exiting the downcomer 18 rises within the riser 30, and the pure liquid L, which is denser, sinks and may be drained through port 58 for recirculation by pump 50. Through the use of valves 52, 54, 56, the flow rate of the recirculating liquid can be controlled by controlling the quantity being mixed from conduit 66 (which feeds pump 50) and conduit 68 (which carries the output of pump 50), particularly through a bypass conduit 70.

Since the two-phase gas and liquid mixture (L+G) rises within the riser 30, it carries energy, which, in a conventional CPLJR, is simply lost to fluid resistance, friction and convection. However, as shown in FIG. 1, a turbine 60 may be in fluid communication with the upper end 72 of the riser 30 such that the flowing two-phase gas and liquid mixture (L+G) can drive the turbine 60. Turbine 60 may be connected to a generator 62 for driving the generator 62 to produce electrical power. This power may be used to partially power the pump 50 and/or may be connected to an external device for providing power thereto. It should be understood that any suitable type of turbine 60 and any suitable number of turbines may be used. Further, it should be understood that the turbine 60 may be directly immersed within the riser 30 or may be fluidly coupled thereto by a pipe, conduit or the like. It should be further understood that the generator 62 may be any suitable type of generator for converting the rotary motion of the turbine 62 into usable electrical power.

The apparatus 10 of FIG. 1 is designed to collect the induced water flowrate, $Q_{in}$, at the bottom of the annular riser 30 that is combined with the jet flowrate at the bottom of the downcomer 18 to ascend inside the riser 30 and collect it at the top of the riser 30. Then it is introduced to a turbine 60 to generate green energy with no extra cost. Due to the density difference between the two-phase flow (gas-water) inside the riser 30 and the pure liquid 16 in the reservoir in the surrounding tank 24, the two-phase flow ascends faster inside the riser 30, inducing more pure water for further dilution, where it gains energy as it moves in the upward direction. The total water flowrate exiting the top of the system (riser 30) will be equal to the water jet flow rate and the induced water flowrate ($Q_j$+$Q_{in}$). This extra induced water flow rate is significant, and it found to be equal 4 to 13 times the water jet 14. The flowrate of the liquid-gas mixture in the air lift column is sufficient to generate a fountain of water that rises above the surface of the reservoir when it exits the top of the riser 30. The present configuration harnesses this energy to perform useful work through a turbine 60 connected to a generator 62.

Figure 3:
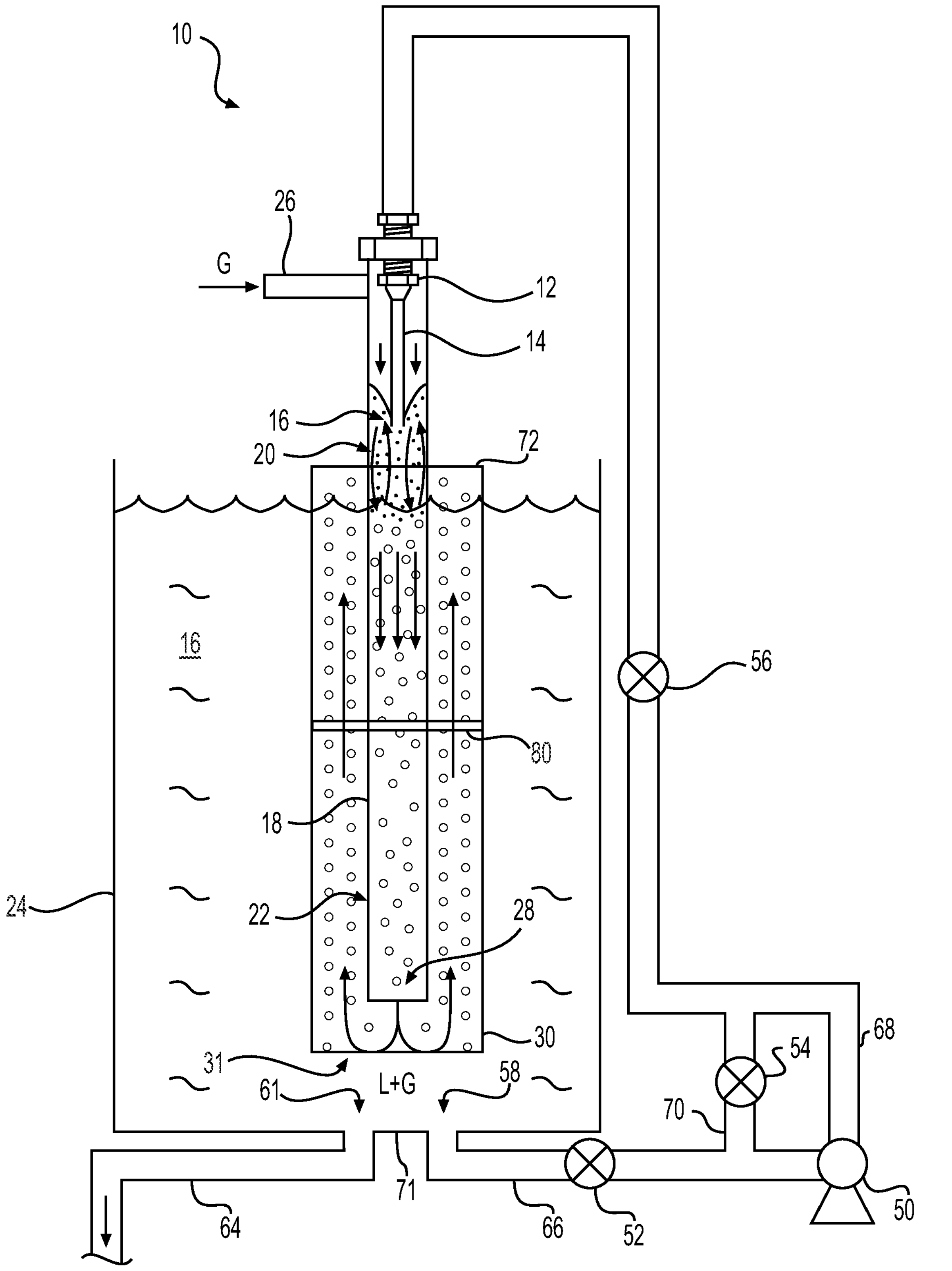
FIG. 3 is schematic diagram of an embodiment of a confined plunging liquid jet reactor having an annular mesh sieve in the air lift column for breaking up bubbles in the rising two-phase fluid within the riser.
Figure 4:
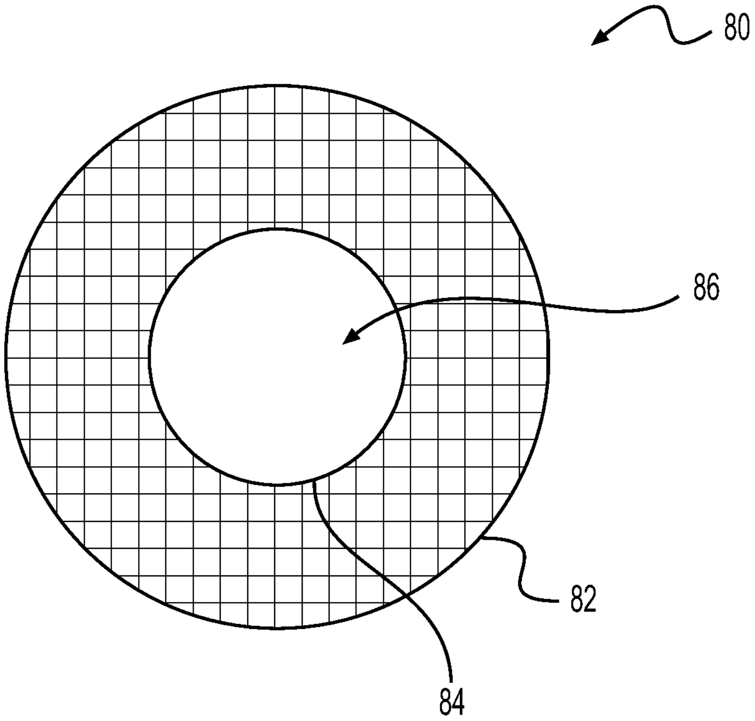
FIG. 4 is a plan view of the annular mesh sieve of FIG. 3.

In the embodiment of FIG. 3, an annular mesh sieve 80 has been added to break up the bubbles in the upwardly flowing two-phase gas and liquid mixture (L+G) into finer bubbles in order to increase the bubble surface area. This increased surface area leads to higher oxygen (or other gas) mass transfer between the gas bubbles and the surrounding liquid, thus augmenting dissolved gas concentration in the liquid without extra cost. As shown in FIG. 4, the annular mesh sieve 80 is formed from a mesh material, and has a circular outer edge 82 and a circular inner edge 84 defining a circular opening 86. The circular opening 86 receives downcomer 18 so that the mesh material extends from an exterior surface of the downcomer 18 to an inner surface of the riser 30 (as shown in FIG. 3). FIG. 3 shows the annular mesh sieve 80 in use with CPLJR 10 of FIG. 1, without the additional turbine 60 and generator 62. However, it should be understood that the annular mesh sieve 80 may be used with the additional turbine 60 and generator 62 as well.

It is to be understood that the confined plunging liquid jet reactor with energy recovery is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A confined plunging liquid jet reactor with energy recovery, comprising:

a tank adapted for holding a reservoir of liquid;

a downcomer, the downcomer being a pipe having an upper end and having an open lower end extending into the tank, the downcomer further having a gas inlet for receiving gas from an external source, the downcomer defining a hollow column;

a nozzle mounted on the upper end of the downcomer, the nozzle being adapted for receiving a pressurized liquid from an external source and configured to generate a liquid jet directed downward in the hollow column;

a riser, the riser being a pipe having opposed upper and lower ends, the riser having a greater diameter than the downcomer and being coaxially disposed around the downcomer, the riser extending deeper into the tank than the downcomer, the lower end of the riser being open so that liquid from the liquid reservoir rises into the riser and into the downcomer, the liquid jet creating turbulence in the liquid in the downcomer to entrain at least some of the gas introduced through the gas inlet into the liquid as the jet travels downward through the downcomer, the riser defining an annular air lift column between the riser and the downcomer, liquid and unentrained gas bubbles exiting the downcomer and rising in the air lift column with significant energy;

a turbine in fluid communication with the upper end of the riser, such that movement of the liquid and unentrained gas in the air lift column drives the turbine; and an electrical generator coupled to the turbine, the generator being driven by the turbine to recover energy from the flow of liquid and unentrained gas in the air lift column.

2. The confined plunging liquid jet reactor as recited in claim 1, wherein the tank has a lower end and at least one port is disposed in the lower end of the tank.

3. The confined plunging liquid jet reactor as recited in claim 2, further comprising a pump in fluid communication with the lower end of the tank through the at least one port, the pump being the external source for delivering the pressurized liquid to the nozzle.

4. A confined plunging liquid jet reactor, comprising:

a tank adapted for holding a reservoir of liquid;

a downcomer, the downcomer being a pipe having an upper end and having an open lower end extending into the tank, the downcomer further having a gas inlet for receiving gas from an external source, the downcomer defining a hollow column;

a nozzle mounted on the upper end of the downcomer, the nozzle being adapted for receiving a pressurized liquid from an external source and configured to generate a liquid jet directed downward in the hollow column;

a riser, the riser being a pipe having opposed upper and lower ends, the riser having a greater diameter than the downcomer and being coaxially disposed around the downcomer, the riser extending deeper into the tank than the downcomer, the lower end of the riser being open so that liquid from the liquid reservoir rises into the riser and into the downcomer, the liquid jet creating turbulence in the liquid in the downcomer to entrain at least some of the gas introduced through the gas inlet into the liquid as the jet travels downward through the downcomer, the riser defining an annular air lift column between the riser and the downcomer, liquid and unentrained gas bubbles exiting the downcomer and rising in the air lift column with significant energy; and an annular mesh sieve disposed in the annular air lift column and extending between the downcomer and the riser, the annular mesh sieve breaking up the gas bubbles in the air lift column into finer bubbles for entraining the gas bubbles into the liquid in the liquid reservoir.

5. The confined plunging liquid jet reactor as recited in claim 4, wherein the tank has a lower end and at least one port is disposed in the lower end of the tank.

6. The confined plunging liquid jet reactor as recited in claim 5, further comprising a pump in fluid communication with the lower end of the tank through the at least one port, the pump being the external source for delivering the pressurized liquid to the nozzle.

* * * * *